United States Patent
Oka et al.

(10) Patent No.: US 9,813,683 B2
(45) Date of Patent: Nov. 7, 2017

(54) LIGHT SOURCE CONTROL APPARATUS, IMAGE DISPLAY APPARATUS AND LIGHT SOURCE CONTROL METHOD

(75) Inventors: Kiyohiro Oka, Kanagawa (JP); Wataru Makino, Aichi (JP)

(73) Assignee: SONY CORPORATION, Tokyo (JP)

( * ) Notice: Subject to any disclaimer, the term of this patent is extended or adjusted under 35 U.S.C. 154(b) by 74 days.

(21) Appl. No.: 13/610,251

(22) Filed: Sep. 11, 2012

(65) Prior Publication Data

US 2013/0063500 A1  Mar. 14, 2013

(30) Foreign Application Priority Data

Sep. 14, 2011  (JP) .................... 2011-200077

(51) Int. Cl.
*H04N 9/31* (2006.01)
*G09G 3/34* (2006.01)

(52) U.S. Cl.
CPC ................. *H04N 9/3155* (2013.01)

(58) Field of Classification Search
CPC .................................................. G09G 3/3046
See application file for complete search history.

(56) References Cited

U.S. PATENT DOCUMENTS

| | | | | |
|---|---|---|---|---|
| 2006/0291441 | A1* | 12/2006 | Akiyama et al. | 370/345 |
| 2009/0268105 | A1* | 10/2009 | Kohashikawa et al. | 348/790 |
| 2010/0073639 | A1* | 3/2010 | Shibasaki | H04N 9/3111 353/31 |
| 2010/0123651 | A1* | 5/2010 | Miller et al. | 345/77 |
| 2011/0037781 | A1* | 2/2011 | Kangas | G09G 3/3406 345/690 |

FOREIGN PATENT DOCUMENTS

| | | |
|---|---|---|
| JP | 9-5710 | 1/1997 |
| JP | 2006-270412 | 10/2006 |
| JP | 2007-279366 | 10/2007 |
| JP | 2008-275769 | 11/2008 |
| JP | 2009-294413 | 12/2009 |
| JP | 2010-197440 | 9/2010 |
| JP | 2011-22447 | 2/2011 |
| JP | 2011-107860 | 6/2011 |
| JP | 2013-501953 | 1/2013 |

* cited by examiner

*Primary Examiner* — Amr Awad
*Assistant Examiner* — Andre Matthews
(74) *Attorney, Agent, or Firm* — Maug Partners LLP; William S. Frommer

(57) ABSTRACT

There is provided a light source control apparatus including an image change determination unit that determines presence or absence of at least one of a change of an image signal and the image signal, and a light source controller that reduces luminous output of a light source at a predetermined decreasing rate when the image change determination unit determines at least one of no change of the image signal and absence of the image signal.

6 Claims, 8 Drawing Sheets

FIG.4A

| BRIGHTNESS LEVEL | NUMBER OF PIXELS | BRIGHTNESS LEVEL | NUMBER OF PIXELS |
|---|---|---|---|
| 1 | 0 | 17 | 1160 |
| 2 | 26881 | 18 | 2989 |
| 3 | 1652 | 19 | 3180 |
| 4 | 4180 | 20 | 1231 |
| 5 | 3167 | 21 | 3970 |
| 6 | 0 | 22 | 4865 |
| 7 | 0 | 23 | 4986 |
| 8 | 835 | 24 | 716698 |
| 9 | 49 | 25 | 0 |
| 10 | 842 | 26 | 0 |
| 11 | 557 | 27 | 0 |
| 12 | 798 | 28 | 0 |
| 13 | 1909 | 29 | 0 |
| 14 | 3089 | 30 | 0 |
| 15 | 1110 | 31 | 0 |
| 16 | 2284 | 32 | 0 |

FIG.4B

| FRAME N | HISTOGRAM |
|---|---|
| FRAME N-1 | HISTOGRAM |
| ⋮ | ⋮ |
| FRAME N-15 | HISTOGRAM |

LIGHT SOURCE CONTROL APPARATUS, IMAGE DISPLAY APPARATUS AND LIGHT SOURCE CONTROL METHOD

BACKGROUND

The present disclosure relates to a light source control apparatus, an image display apparatus, and a light source control method.

In recent years, image display apparatuses such as projectors and liquid crystal monitors are more frequently used not only in businesses, but also in classrooms and academic conferences (see, for example, Japanese Patent Application Laid-Open No. 2011-107860). For example, a teacher projects course content at school and a presenter projects images of research content at an academic conference by a projector to give lessons and present findings to students and the like respectively.

SUMMARY

Though image display apparatuses are used as described above, images are projected and displayed only to be left unused about half the time for teaching or presentation, leading to wasteful power consumption of the image display apparatus.

The present technology is developed in view of the above circumstances and it is desirable to present a light source control apparatus that controls power consumption of a light source, an image display apparatus, and a light source control method.

To resolve the above issue, a light source control apparatus includes an image change determination unit and a light source controller. The image change determination unit determines presence or absence of at least one of a change of an image signal and no signal of the image signal. The light source controller reduces luminous output of a light source at a predetermined decreasing rate when the image change determination unit determines at least one of no change of the image signal and no signal of the image signal.

To resolve the above issue, an image display apparatus includes a light source and the above light source control apparatus.

To resolve the above issue, a light source control method includes an image change determination step of determining presence or absence of at least one of a change of an image signal and no signal of the image signal and a light source control step of reducing luminous output of a light source at a predetermined decreasing rate when at least one of no change of the image signal and no signal of the image signal is determined in the image change determination step.

According to such a light source control apparatus, an image display apparatus, and a light source control method, power consumption of a light source can be controlled.

BRIEF DESCRIPTION OF THE DRAWINGS

FIG. 4 is a diagram exemplifying a histogram of the number of pixels corresponding to a brightness level for each frame according to the first embodiment;

DETAILED DESCRIPTION OF THE EMBODIMENTS

The embodiments will be described below with reference to the drawings.

First Embodiment

Figure 1:
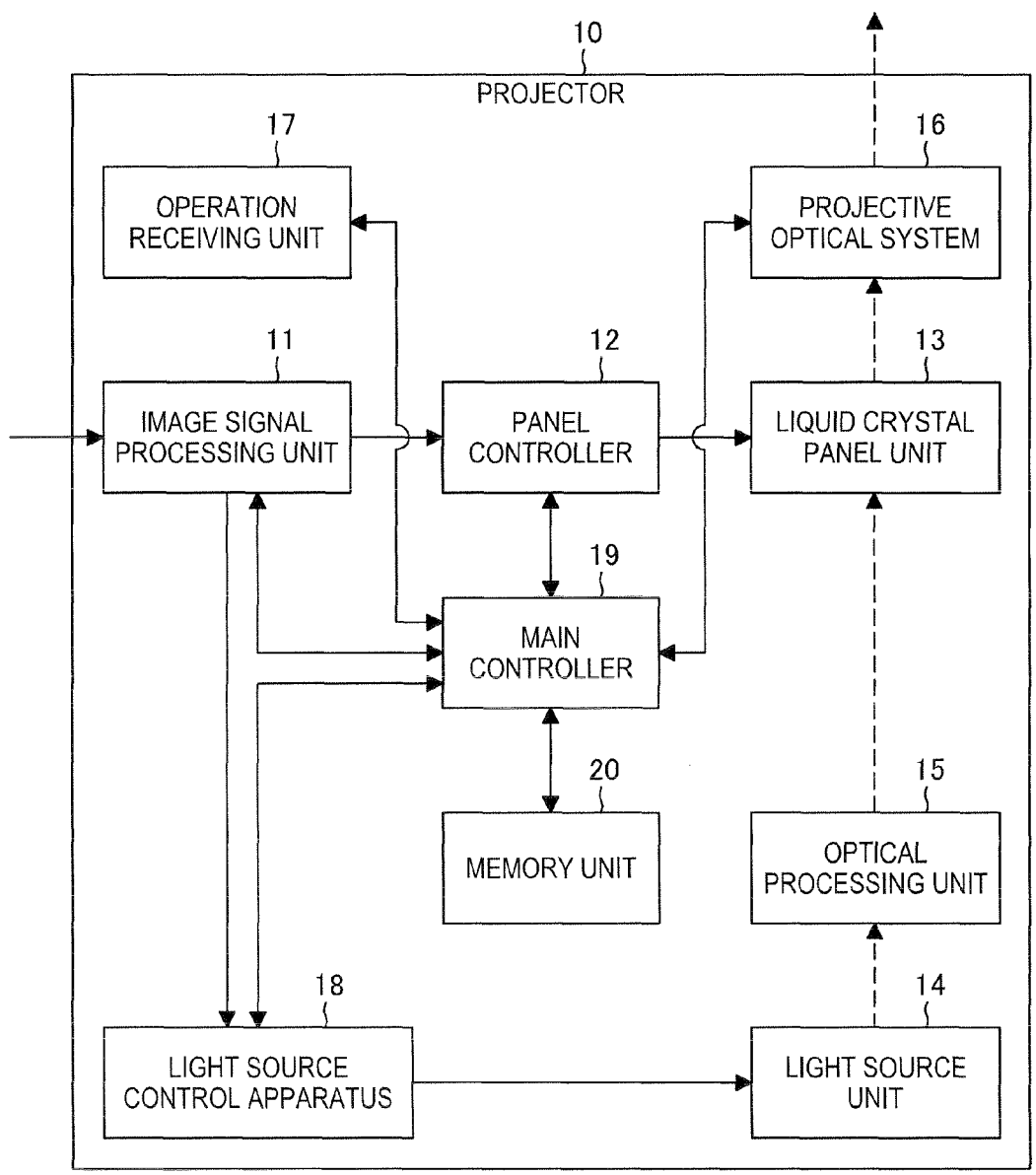
FIG. 1 is a diagram showing a hardware configuration example of a projector according to a first embodiment.

A case of a projector as an example of an image display apparatus is taken as an example to describe the projector by using FIG. 1.

FIG. 1 is a diagram showing a hardware configuration example of a projector according to the first embodiment.

In FIG. 1, input/output of signals/information is indicated by a solid line and input/output of light is indicated by a broken line.

A projector 10 includes an image signal processing unit 11, a panel controller 12, a liquid crystal panel unit 13, a light source unit 14, an optical processing unit 15, and a projective optical system 16. Further, the projector 10 includes an operation receiving unit 17, a light source control apparatus 18, a main controller 19, and a memory unit 20.

The image signal processing unit 11 receives an image signal from, for example, an external device such as a personal computer connected to the projector 10. Then, the image signal processing unit 11 performs necessary processing to display an image on the received image signal.

The panel controller 12 controls an optical modulation operation of the liquid crystal panel unit 13 based on the image signal on which the processing to display an image has been performed by the image signal processing unit 11.

The liquid crystal panel unit 13 modulates light emitted from the light source unit 14 described later in accordance with control from the panel controller 12 to output an optical image based on the image signal received by the image signal processing unit 11.

The light source unit 14 is, for example, a projector lamp manufactured by Philips and compatible with lamp control technology and can change luminous output in accordance with control from the light source control apparatus 18 described later.

The optical processing unit 15 condenses light incident from the light source unit 14 and emits the light to the liquid crystal panel unit 13.

The projective optical system 16 includes lenses and the like and projects an optical image output by the liquid crystal panel unit 13 receiving light emitted from the light source unit 14 on a projection surface such as a screen by enlarging the image.

The operation receiving unit 17 receives operation input of various operation keys such as input switching, luminous output switching, the lens shutter lever, and the focusing ring sheathing the projector 10. Based on various kinds of operation input received by the operation receiving unit 17, the main controller 19 described later exercises control corresponding to each operation.

The light source control apparatus 18 controls luminous output of the light source unit 14. The light source control apparatus 18 can control of the luminous output of the light source unit 14 to, for example, the maximum luminous output (high mode) and 80% (standard mode), 65% (low mode), and 30% (power saving mode) relative to the maximum luminous output in accordance with mode settings by the user. The respective ratio of the standard mode, the lower mode, and the power saving mode to the high mode is not limited to the above value and can appropriately be set. The light source control apparatus 18 controls luminous output of the light source unit 14 in accordance with whether an image signal received from the image signal processing unit 11 changes and whether any image signal is received from the image signal processing unit 11 (whether an image signal is no signal). Details of such control will be described later. The light source control apparatus 18 also turns on/off emission of the light source unit 14 and monitors the status for a luminous error or the like.

The main controller 19 can control the entire projector 10 and particularly controls processing operations of the image signal processing unit 11, the panel controller 12, the projective optical system 16, and the light source control apparatus 18. The main controller 19 also causes the memory unit 20 to hold information and also reads information from the memory unit 20.

The memory unit 20 holds information used and generated by the processing operation of each structural element of the projector 10 by the main controller 19. For example, the memory unit 20 holds information (various programs, parameter data, user setting information and the like) necessary for the image signal processing unit 11 to process an image signal in advance. Also, information about the time (described later) used by the light source control apparatus 18 to reduce luminous output of the light source unit 14 is set by the user and held by the memory unit 20 in advance. The memory unit 20 also holds information about a histogram (described later) generated by the image signal processing unit 11.

In the projector 10 configured as described above, the panel controller 12 controls the optical modulation operation of the liquid crystal panel unit 13 in accordance with the image signal processed by the image signal processing unit 11 to display an image. Then, the liquid crystal panel unit 13 modulates light of luminous output set by the user from the light source unit 14 to output an optical image and the projective optical system 16 projects the optical image on a screen by enlarging the optical image.

Next, the function of the light source control apparatus 18 included in the projector 10 as described above will be described using FIG. 2.

Figure 2:
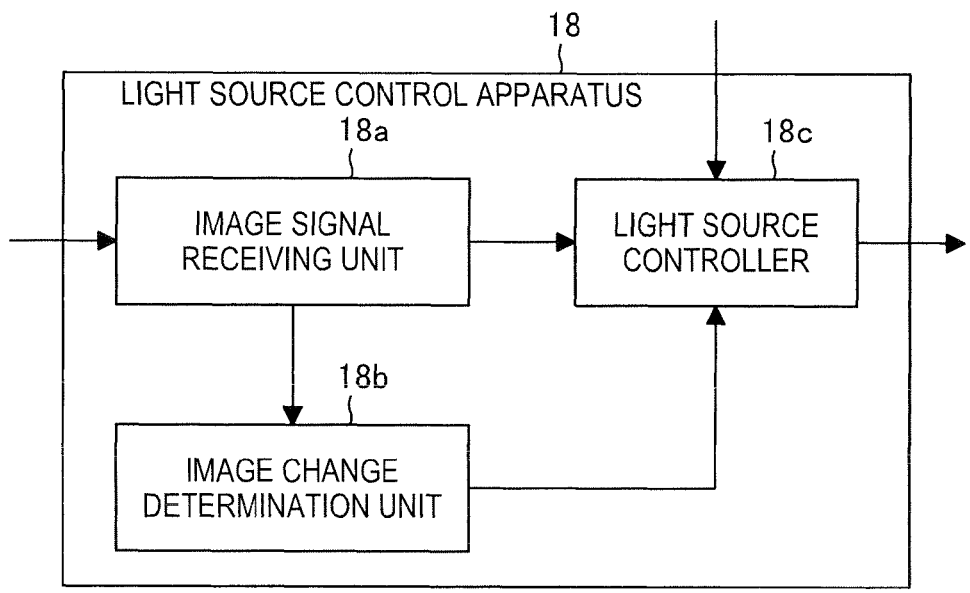
FIG. 2 is a function block diagram showing functions included in a light source control apparatus according to the first embodiment.

FIG. 2 is a function block diagram showing functions included in a light source control apparatus according to the first embodiment.

The light source control apparatus 18 can save power of the light source unit 14 by reducing luminous output of the light source unit 14 at a predetermined decreasing rate when the image signal does not change, the image signal is no signal, or the image is erased based on operation input.

The light source control apparatus 18 includes an image signal receiving unit 18*a*, an image change determination unit 18*b*, and a light source controller 18*c*.

The image signal receiving unit 18*a* receives an image signal from the image signal processing unit 11.

The image change determination unit 18*b* determines whether the image signal has changed. Details of the method of determining whether the image signal has changed will be described later. The image change determination unit 18*b* determines whether any image signal is received by the image signal receiving unit 18*a* (whether no signal or not).

The light source controller 18*c* controls luminous output of the light source unit 14 based on the output mode set by the user. If the image change determination unit 18*b* determines no change (or no signal) of the image signal, the light source controller 18*c* reduces the luminous output of the light source unit 14 in a predetermined decreasing rate. If the image change determination unit 18*b* determines that the image signal that had not changed (or had been no signal) has changed (or has newly been input), the light source controller 18*c* restores the reduced luminous output of the light source unit 14 to the luminous output of the luminous output mode set by the user before the luminous output is reduced.

Next, image signal monitoring processing and image change determination processing performed by the light source control apparatus 18 to save power of the light source unit 14.

First, the image signal monitoring processing will be described using FIGS. 3 and 4.

Figure 3:
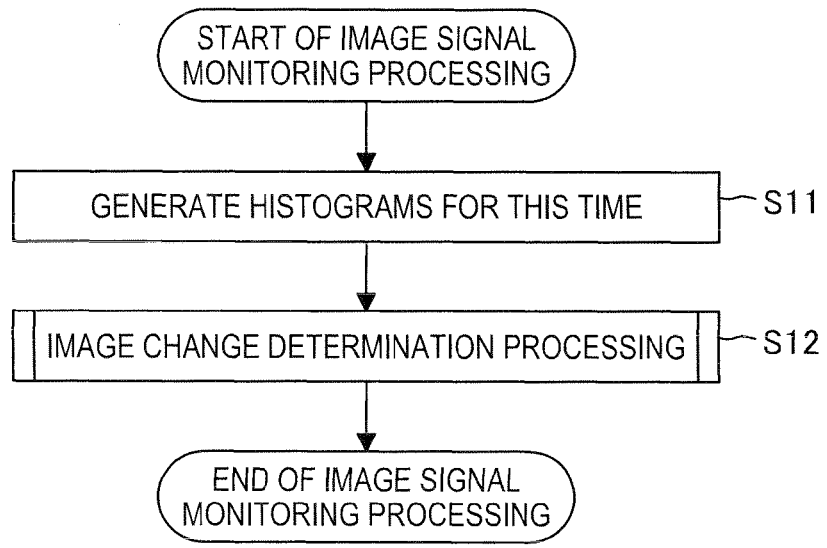
FIG. 3 is a flow chart showing image signal monitoring processing performed by the light source control apparatus according to the first embodiment.

FIG. 3 is a flow chart showing image signal monitoring processing performed by the light source control apparatus according to the first embodiment.

FIG. 4 is a diagram exemplifying a histogram of the number of pixels corresponding to a brightness level for each frame according to the first embodiment. FIG. 4A exemplifies the histogram of frame N when the input is analog XGA (eXtended Graphics Array). FIG. 4B exemplifies the histogram for each frame corresponding to an image signal generated by the image signal processing unit 11.

Each time an image signal to be displayed is input, the projector 10 outputs an optical image based on the image signal received by the liquid crystal panel unit 13 and the light source control apparatus 18 receives the image signal to perform the image signal monitoring processing in accordance with FIG. 3.

[Step S11]

The image change determination unit 18*b* generates a histogram for one frame from, for example, an image signal received by the image signal receiving unit 18*a* from the image signal processing unit 11. Further, the image change determination unit 18*b* acquires each histogram of the latest 16 frames including the histogram acquired this time to calculate an average of the histograms.

For example, the image change determination unit 18*b* divides, as shown in FIG. 4A, the brightness level of frame N for analog XGA into 32 levels (brightness level 1 (minimum) to brightness level 32 (maximum)). Then, the image change determination unit 18*b* adds up the number of pixels of frame N corresponding to the respective brightness level to generate a histogram. Incidentally, the number of pixels for analog XGA is 786432 (=1024×768).

Histograms generated in this manner are stored, as shown in FIG. 4B, in the memory unit 20 for the latest 16 frames. Each time an image signal is input, a histogram is newly generated and the average of histograms for 16 frames (frame N to frame N−15) is updated. The average of histograms calculated in this manner is stored in the memory unit 20 each time the average is updated.

[Step S12]

The image change determination unit 18*b* performs the image signal change determination processing based on a difference between the last average of histograms and the average of histograms calculated in step S11.

That is, if there is no difference of averages of histograms, the image change determination unit 18*b* determines that there is no change of the image signal. On the other hand, if there is a difference of averages of histograms, the image change determination unit 18*b* determines that the image signal has changed.

Next, the image change determination processing (step S12 in FIG. 3) performed by the image change determination unit 18*b* in the image signal monitoring processing as described above will be described using FIG. 5.

Figure 5:
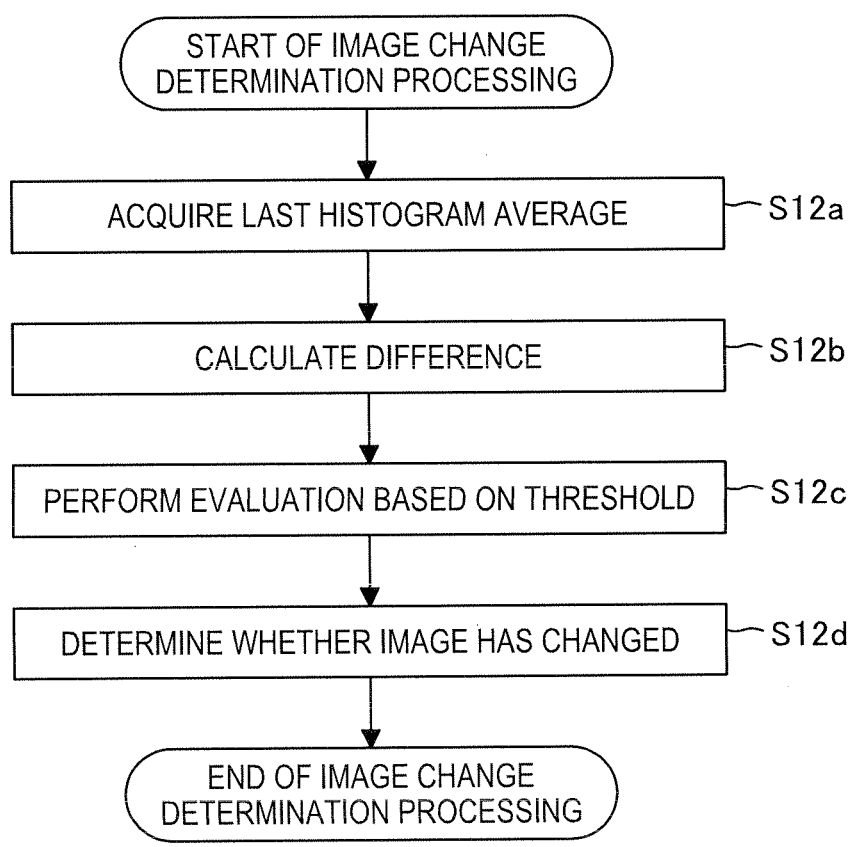
FIG. 5 is a flow chart showing image change determination processing performed by the light source control apparatus according to the first embodiment.

FIG. 5 is a flow chart showing image change determination processing performed by the light source control apparatus according to the first embodiment.

[Step S12*a*]

The image change determination unit 18*b* acquires the last average of histograms from the memory unit 20.

[Step S12*b*]

The image change determination unit 18*b* calculates a difference (absolute value) between the average of histograms for the latest 16 frames generated in step S11 and the average of histograms for the last 16 frames acquired in step S12*a*.

[Step S12*c*]

The image change determination unit 18*b* evaluates whether the difference calculated in step S12*b* is larger than a predetermined threshold.

The difference is evaluated based on a threshold for the reason shown below. If, for example, an image signal of slide for presentation is input into the projector 10 from a personal computer, motion is constantly detected in a histogram of a black screen when the slide ends, leading to instability. Pixels corresponding to the neighborhood of a boundary of the brightness level divided into 32 levels are counted as belonging to one of adjacent brightness levels, leading to unstable information of adjacent brightness levels. In addition, digital data and analog data have different data ranges, affecting necessarily the histogram due to noise. Thus, the difference calculated in step S12*b* becomes rarely zero and thus, the image may be determined to have changed even if the image has hardly changed. Thus, a threshold is set so as to be able to consider that the image has hardly changed and the difference of histograms is evaluated based on such a threshold.

[Step S12*d*]

If the difference calculated in step S12*b* is smaller than the predetermined threshold in an evaluation result in step S12*c*, the image change determination unit 18*b* determines that the image signal has not changed and the same image signal is input. On the other hand, if the difference calculated in step S12*b* is larger than the predetermined threshold, the image change determination unit 18*b* determines that the image signal has changed and an image signal different from the image signal that had been input is input.

If the difference calculated in step S12*b* is larger than the predetermined threshold, the image change determination unit 18*b* may calculate sums of adjacent brightness levels in histogram averages of this time and last time to further calculate a difference of histograms of this time and last time regarding the respective sums. In this case, the image change determination unit 18*b* determines that the same image signal is input if there is no difference and a different signal different from the image signal that had been input is input if there is a difference. Based on the determination as described above, an image change can correctly be determined even if pixels are present in the neighborhood of a boundary of the brightness level divided into 32 levels.

In this manner, the image change determination unit 18*b* determines whether the image signal has changed or there is any image signal based on an evaluation result in step S12*c*.

Next, light source control processing performed by the light source controller 18*c* separately from the image signal monitoring processing will be described using FIGS. 6 and 7.

Figure 6:
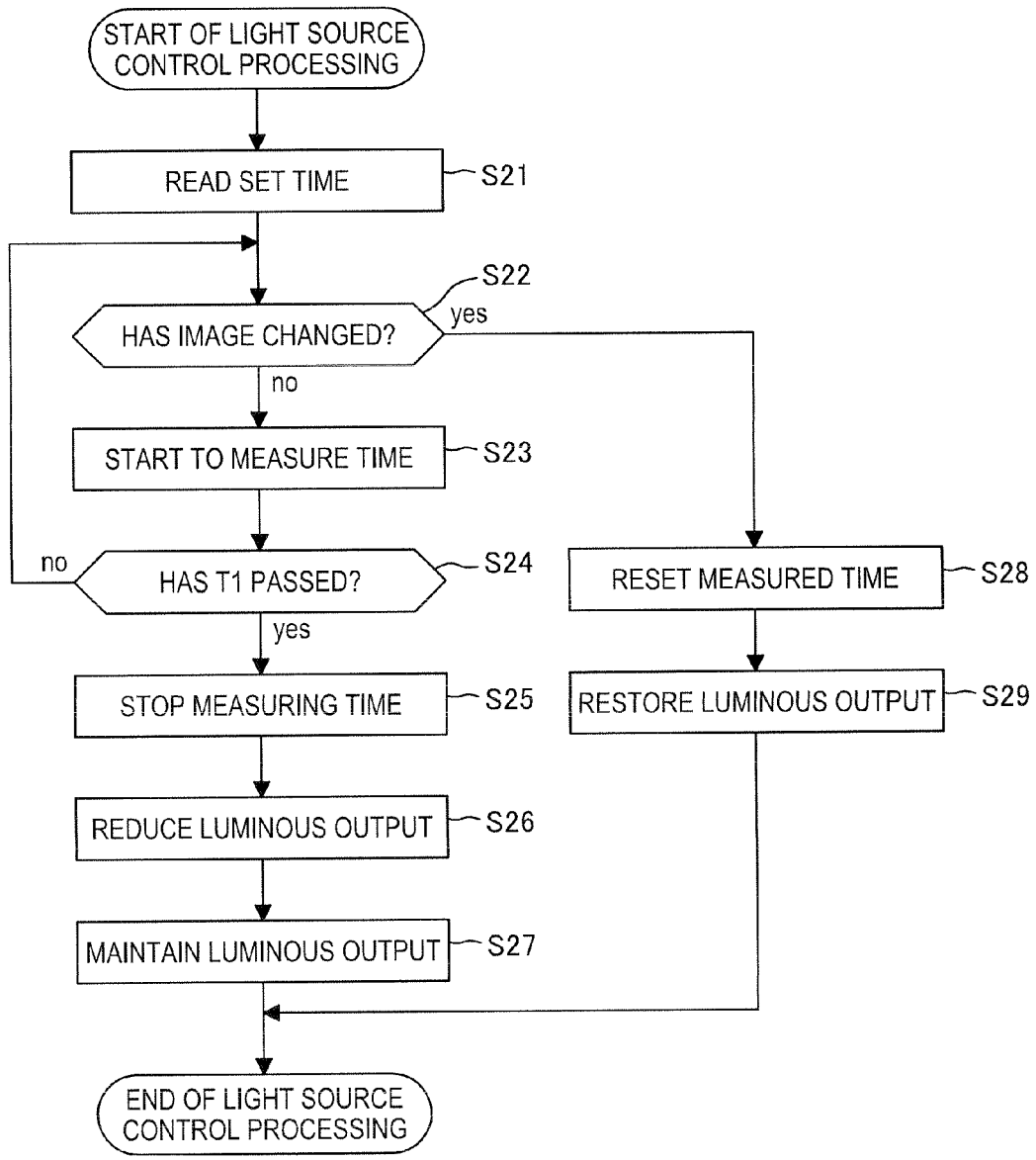
FIG. 6 is a flow chart showing light source control processing performed by the light source control apparatus according to the first embodiment.

FIG. 6 is a flow chart showing light source control processing performed by the light source control apparatus according to the first embodiment.

Figure 7:
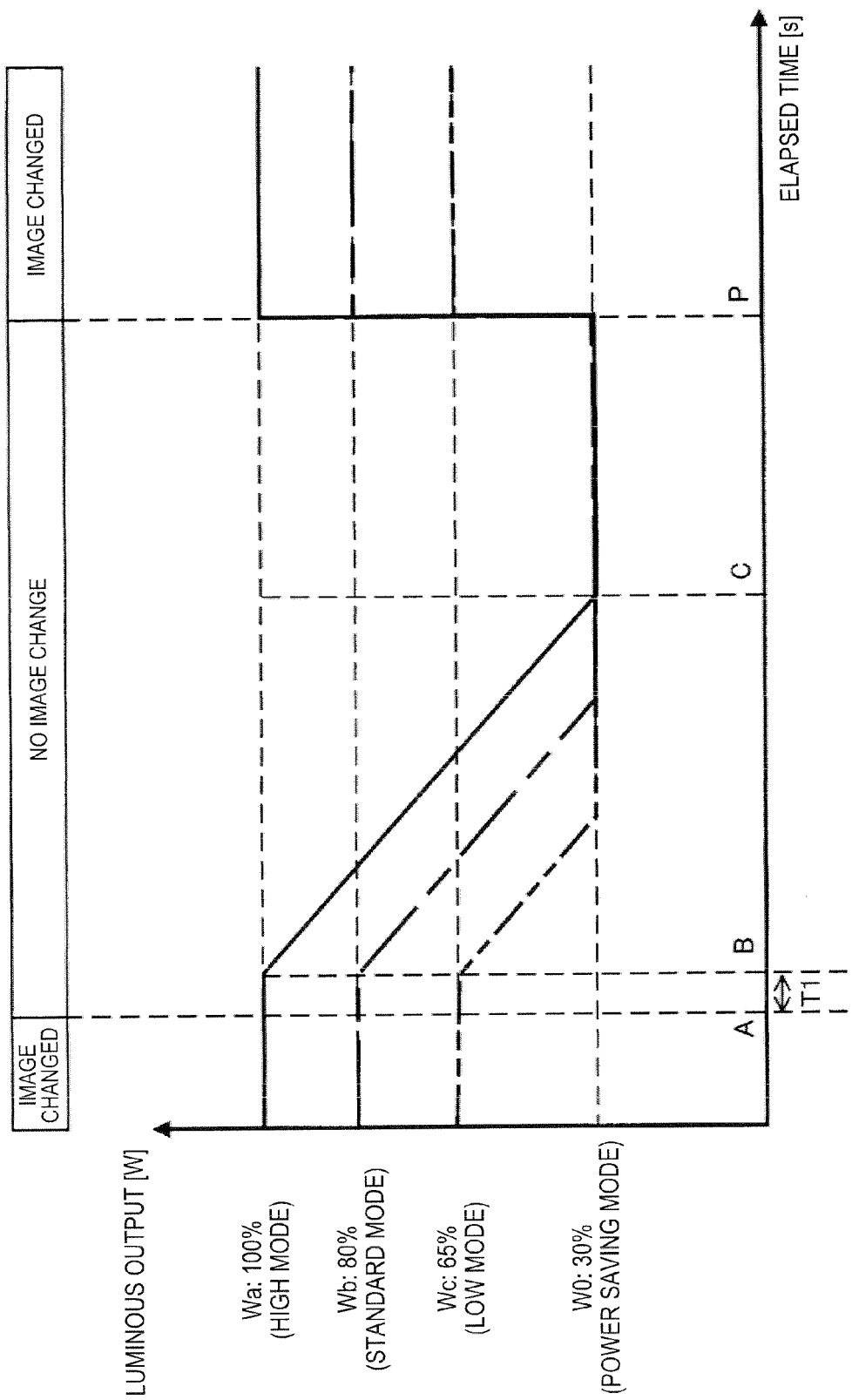
FIG. 7 is a diagram showing changes of luminous output by the light source control processing performed by the light source control apparatus according to the first embodiment.

FIG. 7 is a diagram showing changes of luminous output by the light source control processing performed by the light source control apparatus according to the first embodiment. In the graph in FIG. 7, the horizontal axis represents the elapsed time and the vertical axis represents luminous output from the light source unit 14. Whether the image changes or not is indicated in the upper portion of the graph. Also, changes in accordance with whether the image in each output mode of the light source unit 14 of the luminous output Wa (100%: high mode), Wb (80%: standard mode), and Wc (65%: low mode) changes are shown.

[Step S21]

The light source controller 18*c* reads the preset time (for example, a time T1 described later in the first embodiment) to start to reduce the luminous output of the light source unit 14 from the memory unit 20.

[Step S22]

The light source controller 18*c* moves to processing in step S23 if the image signal has not changed based on the determination result of change of the image signal in step S12 of FIG. 3 (step S12*d* of FIG. 5), and moves to processing in step S28 if the image signal has changed.

[Step S23]

If no change of the image signal is determined (for example, A point in FIG. 7), the light source controller 18*c* starts to measure the time.

The light source controller 18*c* also starts to measure the time if no signal of the image signal is determined at A point in FIG. 7.

[Step S24]

If the measured time reaches the time (time T1) read in step S21, the light source controller 18*c* moves to processing in step S25. Before the measured time reaches the time, the light source controller 18*c* returns to the processing in step S22. Incidentally, a certain amount of time is necessary to determine whether any image signal is present. The time T1 is such a time, can arbitrarily be set by the user, and is, for example, 10 to 20 s.

[Step S25]

The light source controller 18*c* stops measuring the time.

[Step S26]

If the time read in step S21 passes, the light source controller 18*c* starts to reduce the luminous output of the light source unit 14 at a predetermined decreasing rate. With this operation, the image projected from the projector 10 gradually becomes darker.

In the case of FIG. 7, the light source controller 18*c* starts to reduce the luminous output of the light source unit 14 at B point when the time T1 passes. When the luminous output of the light source unit 14 is reduced, the luminous output is reduced at such a decreasing rate that prevents the audience (presentee) who hears a presentation by the presenter using the projector 10 from noticing the reduced luminous output. The presentee can be made to concentrate on the presentation by the presenter by preventing the presentee from noticing the reduced luminous output of the light source unit 14. Actual trials of various decreasing rates show that the luminous output of the light source unit 14 can be reduced without being noticed by the presentee when the decreasing rate of about 5 W/s corresponding to one variable step of a lamp whose luminous output is 215 W is used.

[Step S27]

If the luminous output of the light source unit 14 reduced in step S26 reaches a predetermined lower limit, the light source controller 18c maintains the luminous output that has reached the lower limit of the light source unit 14. Accordingly, power of the light source unit 14 can be saved.

In FIG. 7, as the lower limit, for example, luminous output W0, which is 30% of the maximum luminous output, is set as the power saving mode. In the high mode of FIG. 7, the light source controller 18c reduces the luminous output Wa of the light source unit 14 at the decreasing rate of about 2 W/s from B point and maintains the luminous output W0 of 30% at C point when the luminous output Wa reaches 30% and thereafter.

[Step S28]

If the image signal is determined to have changed in step S22, the light source controller 18c resets the measured time.

[Step S29]

The light source controller 18c restores the reduced luminous output of the light source unit 14 to the luminous output of the luminous output mode set by the user before the luminous output is reduced.

In the high mode of FIG. 7, if the image signal is determined to have changed at P point while the light source unit 14 is maintained at luminous output W0 of 30% at C point or thereafter, the light source controller 18c restores the luminous output W0 to the luminous output Wa.

The luminous output Wa of the light source unit 14 is reduced up to the luminous output W0 and maintained there and the light source unit 14 is not completely turned off and thus, it does not take time to restore the luminous output to the initial luminous output Wa. Therefore, if, for example, the image signal changes by input of another image signal from an image signal whose luminous output is reduced, the presentee can visually recognize another projected image without being caused to wait.

The occurrence of change of an image signal to restore luminous output is not limited to C point or thereafter in FIG. 7 and the light source controller 18c can restore the luminous output up to the initial luminous output Wa also if the image signal changes while the luminous output Wa of the light source unit 14 in the high mode is reduced (between B point and C point).

Thus, in the light source control apparatus 18, if the image change determination unit 18b determines that the image signal has not changed (the same image signal is input) or the image signal is no signal, the light source controller 18c reduces the luminous output of the light source unit 14 at such a decreasing rate that the presentee does not notice the reduced luminous output. Accordingly, power of the light source unit 14 can be saved and further, the presentee can be made to concentrate on the presentation of the presenter.

If the image change determination unit 18b determines that the image signal has changed (an image signal different from the image signal that has been input is input) while the light source controller 18c reduces the luminous output of the light source unit 14 or maintains a reduced state of the luminous output, the light source controller 18c restores the luminous output of the light source unit 14 to the initial luminous output. The luminous output of the light source unit 14 is not turned off even if reduced and thus, if, for example, the presenter attempts to display another image from an image whose luminous output is reduced, the luminous output of the light source unit 14 can quickly be restored, enabling the presentee to visually recognize the other image without being caused to wait.

Second Embodiment

In the second embodiment, another method of reducing the luminous output of the light source unit 14 when the image signal has not changed will be described.

Also in the second embodiment, the light source control apparatus 18 of the projector 10 in FIGS. 1 and 2 performs the image signal monitoring processing (FIG. 3) and the light source control processing (FIG. 8) to save power of the light source unit 14.

First, like in the first embodiment, the light source control apparatus 18 generates histograms in the image signal monitoring processing (step S11) and performs the image change determination processing (step S12, FIG. 5). The light source control apparatus 18 performs the light source control processing based on an image change determination result in the image signal monitoring processing.

The light source control processing performed in the second embodiment will be described below using FIGS. 8 and 9.

Figure 8:
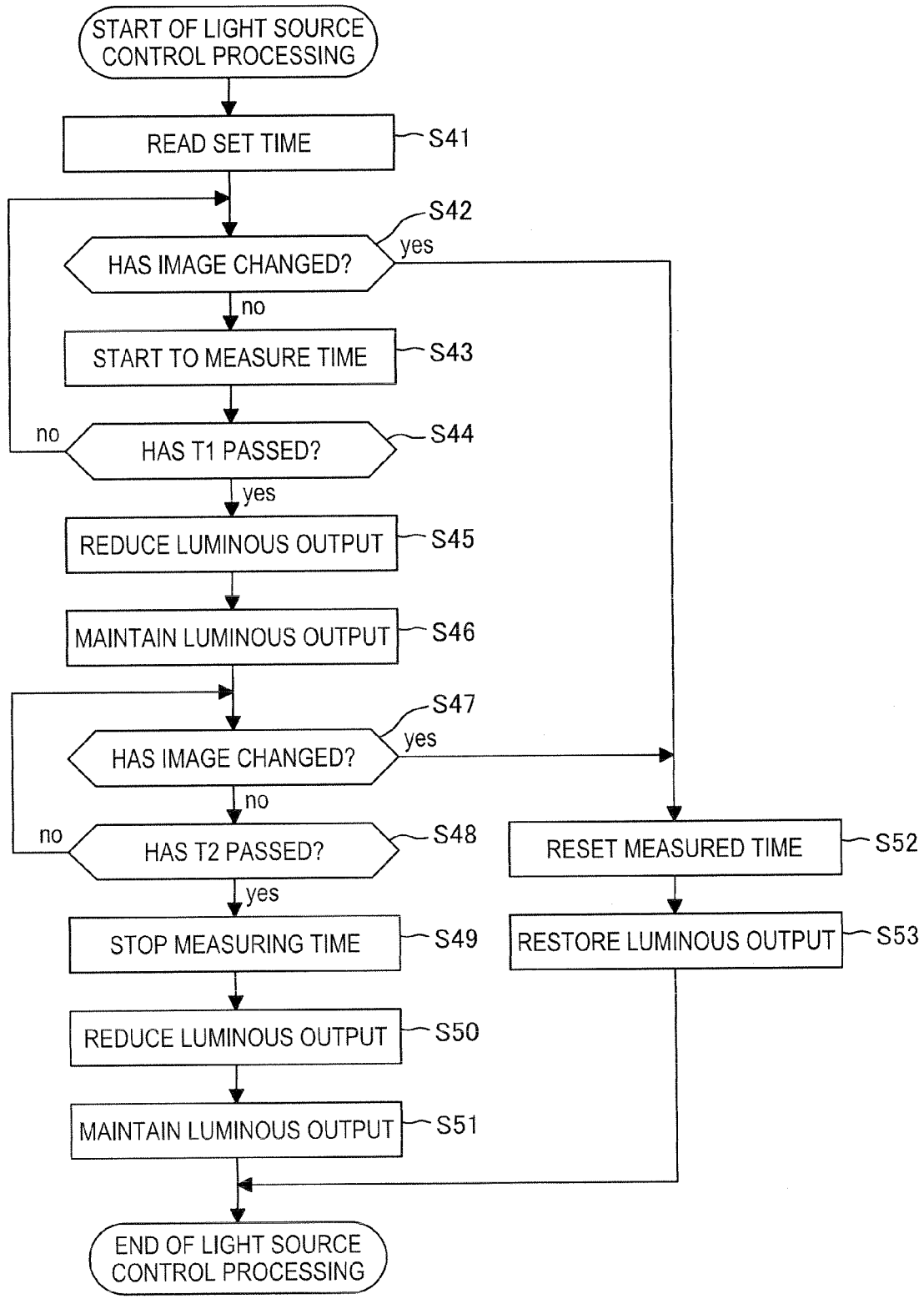
FIG. 8 is a flow chart showing the light source control processing performed by the light source control apparatus according to a second embodiment.

FIG. 8 is a flow chart showing the light source control processing performed by the light source control apparatus according to the second embodiment.

Figure 9:
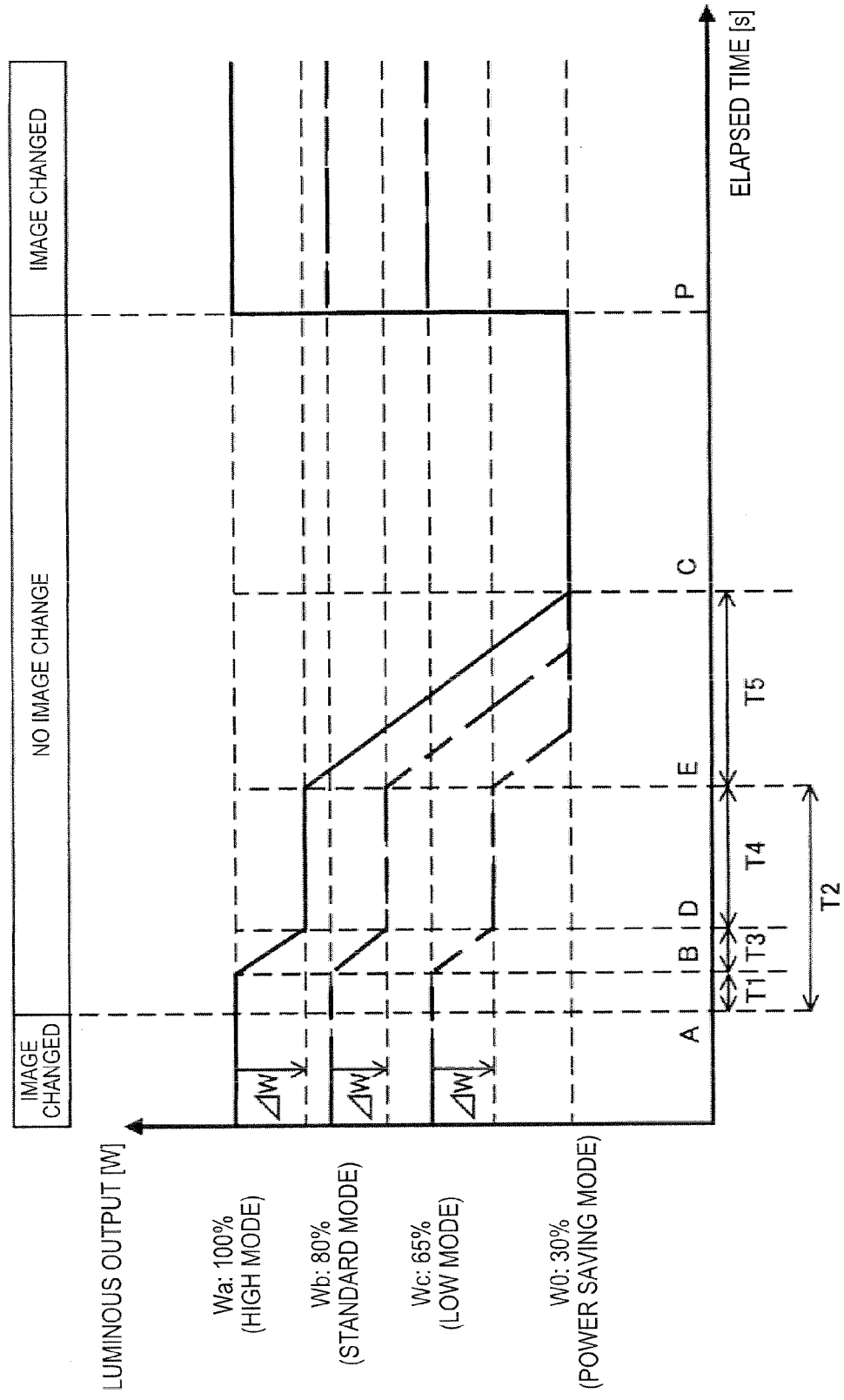
FIG. 9 is a diagram showing changes of luminous output by the light source control processing performed by the light source control apparatus according to the second embodiment.

FIG. 9 is a diagram showing changes of luminous output by the light source control processing performed by the light source control apparatus according to the second embodiment. In FIG. 9, the horizontal axis and the vertical axis are the same as in FIG. 7.

[Steps S41 to S44]

The light source controller 18c performs respective processing similar to steps S21 to S24 in FIG. 6.

In step S41, in addition to the time T1, a time T2 is also acquired.

[Step S45]

If the time T1 read in step S41 passes, the light source controller 18c starts to reduce the luminous output of the light source unit 14 at a predetermined decreasing rate. With this operation, the brightness of an optical image projected from the projector 10 is slightly reduced.

In each output mode in FIG. 9, it is desirable to set the decreasing rate when the luminous output Wa, Wb, Wc of the light source unit 14 at B point when the time T1 passes or thereafter is reduced to about 5 W/s or less. Accordingly, the presentee can be made to concentrate on the presentation by the presenter by preventing the presentee from noticing the reduced luminous output of the light source unit 14.

[Step S46]

If the luminous output of the light source unit 14 reduced at the predetermined decreasing rate is reduced by a predetermined an amount, the light source controller 18c maintains the reduced luminous output.

In each output mode in FIG. 9, the luminous output Wa, Wb, Wc of the light source unit 14 is reduced by about 5 W/s or less from B point and when reduced by ΔW from the initial luminous output Wa, Wb, Wc, the luminous output Wa, Wb, Wc reduced by ΔW is maintained. This ΔW is such an amount that it is difficult for the presentee to notice that the luminous output Wa, Wb, Wc of the light source unit 14 is reduced from a projected image in accordance with the ΔW-reduced luminous output Wa, Wb, Wc. The ΔW is also such an amount that even if the luminous output Wa, Wb, Wc in each output mode is reduced by ΔW, differences of the luminous output Wb, Wc, W0 from the lower output mode can be retained so that each output mode can be distinguished. Further, it is desirable to set ΔW as high as possible from the viewpoint of energy saving. In view of such points, ΔW is desirably 10% to 15% with respect to the initial luminous output Wa, Wb, Wc so that the ΔW-reduced luminous output Wa, Wb, Wc becomes about 85% to 90% with respect to the initial luminous output.

In this case, a time T3 passes before the luminous output is reduced by ΔW. The time T3 (=ΔW/decreasing rate) is calculated by the light source controller 18c.

[Step S47]

Processing similar to step S42 is performed. However, if there is no image change, the processing moves to processing in step S48.

[Step S48]

If the time measured in step S43 passes the time (for example, the time T2 (E point) in FIG. 9) read in step S41, the light source controller 18c moves to processing in step S49. Before the measured time passes the time, the processing returns to the processing in step S47.

The period between B point and E point through D point in FIG. 9 can be considered to be relatively early after the image signal becomes non-changing. Thus, the presenter is likely to be giving a presentation by using a projected image corresponding to the non-changing image signal from the projector 10.

In view of such points, power consumption is controlled by the processing in steps S45 to S48 by reducing the luminous output to such an extent hardly noticed by the presentee and maintaining the reduced state. That is, an impression of visually recognizing a projected image that is hardly changed in luminous output from the initially shown image is given to the presentee. Therefore, it is desirable to set the time T2 based on the presentation time of the presenter using a projected image and the time T2 can be considered to be, for example, 300 s (5 min) to 12000 s (20 min).

In this case, a time T4 passes before moving to step S49 after the luminous output is reduced by ΔW. The time T4 (=time T2−(time T1+time T3)) is calculated by the light source controller 18c.

[Step S49]

The light source controller 18c stops measuring the time.

[Step S50]

The light source controller 18c starts to reduce the luminous output of the light source unit 14 at a predetermined decreasing rate. With this operation, the image projected from the projector 10 becomes darker within the range of visibility.

Also in FIG. 9, the light source controller 18c reduces the luminous output of the light source unit 14 by about 5 W/s or less as described above at E point when the time T2 passes or thereafter to prevent the presentee from noticing the reduced luminous output of the light source unit 14 so that the presentee can be made to concentrate on the presentation of the presenter.

In this case (high mode), a time T5 passes before the luminous output is reduced to W0 after starting to reduce the luminous output. The time T5 (=(luminous output Wa reduced by ΔW)/decreasing rate) is calculated by the light source controller 18c.

[Step S51]

If the luminous output of the light source unit 14 reduced in step S50 reaches a predetermined lower limit, the light source controller 18c maintains the luminous output that has reached the lower limit of the light source unit 14. Accordingly, power of the light source unit 14 can be saved.

Also in FIG. 9, the luminous output W0 (30% in power saving mode) is set as a lower limit. In the high mode, the light source controller 18c reduces the ΔW-reduced luminous output Wa of the light source unit 14 at the decreasing rate of about 2 W/s from E point and maintains the luminous output W0 at C point when the luminous output reaches the luminous output W0 and thereafter.

[Steps S52, 53]

The light source controller 18c performs respective processing similar to steps S28 and S29 in FIG. 6.

Regarding the luminous output in step S53, FIG. 9 shows a case when the light source controller 18c restores the luminous output to the luminous output Wa, Wb, Wc after a change of the image signal or changes of the signal level and stability at P point while the luminous output W0 is maintained at C point and thereafter. The light source controller 18c can restore, not only in this case, the luminous output to the initial luminous output Wa, Wb, Wc if the image signal changes while the luminous output of the light source unit 14 is reduced (B point to D point to E point to C point).

In the second embodiment, the reduced luminous output of the light source unit 14 is restored when the image signal changes. In addition to such a case, the luminous output may be restored as shown below.

The user performs operation input of any operation key of the projector 10, external control or the like after the image signal is determined not to have changed and the reduction of luminous output of the light source unit 14 is started or while the reduced luminous output is maintained. When the operation receiving unit 17 receives the operation input or external control, the main controller 19 notifies the light source control apparatus 18 of a restoration request. When the restoration request is notified, the light source controller 18c performs restoration processing (steps S52, S53 in FIG. 8) of the luminous output on the light source unit 14. If, for example, the presenter continues to use the current projected image for presentation after the time T2 passes in FIG. 9 or the presenter wants to give a presentation again by using a projected image whose luminous output has been reduced after C point, such a restoration method can be used. According to the method, it is not necessary to change the image signal and thus, the presenter can quickly restore the luminous output easily only by operating any operation key of the projector 10 when, for example, another image should not be displayed in consideration of staging for presentation.

Thus, in the light source control apparatus 18, if the image change determination unit 18b determines that the image signal has not changed (the same image signal is input), the light source controller 18c reduces the luminous output of the light source unit 14 at such a decreasing rate that the presentee does not notice the reduced luminous output. Accordingly, power of the light source unit 14 can be saved and further, the presentee can be made to concentrate on the presentation of the presenter.

Particularly when luminous output of the light source unit 14 is reduced, the luminous output is reduced to such an extent that the presentee hardly notices and after the reduced state is maintained, the luminous output is reduced at a predetermined decreasing rate. Accordingly, even in a relatively early stage after the same image signal is input in which the presenter is expected to use a projected image, the presentee can be made to concentrate on the presentation of the presenter while saving power of the light source unit 14.

If the image change determination unit 18b determines that the image signal has changed (an image signal different from the image signal that has been input is input) while the light source controller 18c reduces the luminous output of the light source unit 14 or maintains a reduced state of the luminous output, the light source controller 18c restores the luminous output of the light source unit 14 to the luminous output of the luminous output mode set by the user before the luminous output is reduced. The luminous output of the light source unit 14 is not turned off even if reduced and thus, if, for example, the presenter attempts to display another image from an image whose luminous output is reduced, the luminous output of the light source unit 14 can quickly be restored, enabling the presentee to visually recognize the other image without being caused to wait.

If, separately from such restoration of the luminous output, operation input performed by the user on any operation key of the projector 10 or input from external control is received by the operation receiving unit 17, the light source controller 18c performs restoration processing of the luminous output on the light source unit 14. Therefore, the presenter can quickly restore the luminous output easily only by operating any operation key of the projector 10 and the presentee can visually recognize a projected image that has become visually non-recognizable due to reduced luminous output of the light source unit 14 again.

Additionally, the present technology may also be configured as below.

(1) A light source control apparatus, including:
an image change determination unit that determines presence or absence of at least one of a change of an image signal and the image signal; and
a light source controller that reduces luminous output of a light source at a predetermined decreasing rate when the image change determination unit determines at least one of no change of the image signal and absence of the image signal.

(2) The light source control apparatus according to (1),
wherein the light source controller maintains the luminous output of the light source in a state of being reduced by a fixed amount.

(3) The light source control apparatus according to (2),
wherein the light source controller again reduces the maintained luminous output of the light source at a predetermined decreasing rate.

(4) The light source control apparatus according to any one of (1) to (3),
wherein the light source controller reduces the luminous output of the light source up to a predetermined lower limit at the decreasing rate.

(5) The light source control apparatus according to any one of (2) to (4),
wherein when the image change determination unit determines one of the change of the image signal and presence of the image signal while the luminous output is reduced or the reduced luminous output is maintained, the light source controller restores the luminous output of the light source to initial luminous output.

(6) The light source control apparatus according to (1),
wherein the decreasing rate is 5 W/s or less.

(7) The light source control apparatus according to (2),
wherein the luminous output reduced by the fixed amount is 85% to 90% of the luminous output of a luminous output mode set by a user.

(8) The light source control apparatus according to (1),
wherein the image change determination unit determines presence or absence of at least one of the change of the image signal and the image signal in accordance with a histogram of the number of pixels corresponding to each brightness of a frame based on the image signal.

(9) The light source control apparatus according to (8),
wherein the image change determination unit determines presence or absence of at least one of the change of the image signal and the image signal based on a difference between the histogram and a histogram corresponding to a past image signal.

(10) An image display apparatus, including:
a light source; and
a light source control apparatus, including an image change determination unit that determines presence or absence of at least one of a change of an image signal and the image signal and a light source controller that reduces luminous output of the light source at a predetermined decreasing rate when the image change determination unit determines at least one of no change of the image signal and absence of the image signal.

(11) A light source control method, including:
determining presence or absence of at least one of a change of an image signal and the image signal; and
reducing luminous output of a light source at a predetermined decreasing rate when at least one of no change of the image signal and absence of the image signal is determined in the image change determination step.

Various modifications of the above embodiments can be made without deviating from the scope of the embodiments.

Further, the above embodiments can undergo many alterations and modifications for those skilled in the art and are not limited to the described correct configurations and application examples.

The present disclosure contains subject matter related to that disclosed in Japanese Priority Patent Application JP 2011-200077 filed in the Japan Patent Office on Sep. 14, 2011, the entire content of which is hereby incorporated by reference.

What is claimed is:

1. A light source control apparatus for a projector that projects viewable images, comprising:
an image change determination unit that determines presence or absence of an image signal; and
a light source controller that (i) controls a light source of the projector to emit light at a particular luminous output for a predetermined time even in the absence of the image signal, the light source emitting light at a respective luminous output corresponding to a particular one of a plurality of output modes selected by a user, (ii) reduces at a predetermined linear rate equal to 5 W/s or less, when a first output mode is selected, the luminous output of the light source in the absence of the image signal following the predetermined time such that the reduction in the luminous output is not discerned by observers of the projected image, (iii) maintains, when a second output mode is selected, the particular luminous output of the light source corresponding to the second output mode in the absence of the image signal for more than the predetermined time, and (iv) restores the reduced luminous output of the light source to the respective luminous output corresponding to the first output mode for the case that the image signal is input.

2. The light source control apparatus according to claim 1, wherein the light source controller reduces the luminous output of the light source up to a predetermined lower limit at the decreasing rate.

3. The light source control apparatus according to claim 1, wherein the luminous output is reduced when the first output mode is selected by an amount of 85% to 90% of the luminous output of the output mode selected by the user.

4. The light source control apparatus according to claim 1, wherein the image change determination unit determines presence or absence of the image signal based on a difference between an average of histograms of the number of pixel corresponding to each brightness of a frame based on the image signal for a particular number of latest frames and a histogram corresponding to a past image signal.

5. An image display apparatus for a projector that projects viewable images, comprising:
  an image display projector including a light source; and
  a light source control apparatus, including an image change determination unit that determines presence or absence of an image signal, and a light source controller that (i) controls the light source to emit light at a particular luminous output for a predetermined time even in the absence of the image signal, the light source emitting light at a respective luminous output corresponding to a particular one of a plurality of output modes selected by a user, (ii) reduces at a predetermined linear rate equal to 5 W/s or less, when a first output mode is selected, the luminous output of the light source of the image display projector in the absence of the image signal following the predetermined time such that the reduction in the luminous output is not discerned by observers of the projected image, (iii) maintains, when a second output mode is selected, the particular luminous output of the light source corresponding to the second output mode in the absence of the image signal for more than the predetermined time, and (iv) restores the reduced luminous output of the light source to the respective luminous output corresponding to the first output mode for the case that the image signal is input.

6. A light source control method for an image display apparatus for a projector that projects viewable images, comprising:
  determining presence or absence of an image signal;
  controlling a light source of the projector to emit light at a particular luminous output for a predetermined time even in the absence of the image signal, the light source emitting light at a respective luminous output corresponding to a particular one of a plurality of output modes selected by a user;
  reducing at a predetermined linear rate equal to 5 W/s or less, when a first output mode is selected, the luminous output of the light source in the absence of the image signal following the predetermined time such that the reduction in the luminous output is not discerned by observers of the projected image;
  maintaining, when a second output mode is selected, the particular luminous output of the light source corresponding to the second output mode in the absence of the image signal for more than the predetermined time; and
  restoring the reduced luminous output of the light source to the respective luminous output corresponding to the first output mode for the case that the image signal is input.

* * * * *